(12) United States Patent
Dicke (10) Patent No.: US 12,126,780 B2
(45) Date of Patent: Oct. 22, 2024

(54) METHOD FOR ADAPTING THE PRINTER PARAMETERS OF A DIGITAL PRINTER

(71) Applicant: SWISS KRONO Tec AG, Lucerne (CH)

(72) Inventor: Sebastian Dicke, Bantikow (DE)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 18/284,910

(22) PCT Filed: Mar. 30, 2022

(86) PCT No.: PCT/EP2022/058387
§ 371 (c)(1),
(2) Date: Sep. 29, 2023

(87) PCT Pub. No.: WO2022/207690
PCT Pub. Date: Oct. 6, 2022

(65) Prior Publication Data
US 2024/0275905 A1 Aug. 15, 2024

(30) Foreign Application Priority Data
Mar. 30, 2021 (EP) .................................... 21165922

(51) Int. Cl.
*H04N 1/60* (2006.01)
(52) U.S. Cl.
CPC ................. *H04N 1/6036* (2013.01)
(58) Field of Classification Search
CPC .................................................. H04N 1/6036
See application file for complete search history.

(56) References Cited

U.S. PATENT DOCUMENTS

2007/0002344 A1 1/2007 Klassen
2016/0052318 A1 2/2016 Humet Pous et al.
(Continued)

FOREIGN PATENT DOCUMENTS

DE 102017202031 A1 9/2017
EP 3020565 B1 11/2016
(Continued)

OTHER PUBLICATIONS

Chiou, W.C., "NASA image-based geological expert system-development project for hyperspectral image-analysis", App. Opt., 1985, pp. 2085-2091, vol. 24, No. 14.
(Continued)

*Primary Examiner* — Christopher Wait
(74) *Attorney, Agent, or Firm* — The Webb Law Firm (57) ABSTRACT

The invention relates to a method for adapting the printer parameters of a digital printer. A tone value target with 1 to n tone value fields, where n∈N, is output onto a carrier material, and at least some of the tone value fields are measured in a hyperspectral manner. A digital reference pattern is generated from the measurement data. The tone value target is output onto a second carrier material, and at least some of the tone value fields are then measured in a hyperspectral manner. A digital pattern is generated from the measurement data, said digital pattern being compared with the digital reference pattern. At least one similarity value is ascertained, and if the similarity value lies outside of a specified tolerance range, at least one printer parameter or a combination of multiple printer parameters are adapted. The invention additionally relates to a device for carrying out the method according to the invention.

15 Claims, 1 Drawing Sheet

(56) References Cited

U.S. PATENT DOCUMENTS

2017/0259581 A1 9/2017 Pfeiffer
2018/0095307 A1 4/2018 Herloski

FOREIGN PATENT DOCUMENTS

| EP | 3578939 A1 | | 12/2019 | |
|---|---|---|---|---|
| EP | 3868559 A1 | * | 8/2021 | ......... B41F 33/0036 |
| EP | 3961166 A1 | | 3/2022 | |
| WO | 2014154302 A1 | | 10/2014 | |

OTHER PUBLICATIONS

"Erste Inline-Farbmessung in Betrieb [first in-line color measurement in operation]", Material+Technik Möbel, Jun. 2019, p. 43, www.material-technik.de/e-magazine/material-technikmoebel-06-19. (English Translation).
"ICMS(TM) zero Zertifizierung", 2019, www.ipac.at/palmCMSv3/_dateimanager/Download_Deutsch/ICMS_zero_Zertifizierung_DE.pdf (relevant for reasons described in the International Preliminary Report on Patentability).
"IPAC—Advanced Colour Management System", Printer's Regular's Round Table, HdM Stuttgart, 2016.
"IPAC—Quality Inside—Made in Europe: First inline colour measurement in operation", Möbelmarkt, Sep. 2019, www.moebelmarkt.de/beitrag/ipac-quality-inside-made-in-europe-first-inline-colour-measurement-in-operation.
Michelsburg, M., . "Material classification in optical inspection systems with the aid of hyperspectral data", Dissertation, Karlsruher Institut für Technologie KIT, 2014.
Veys et al., "An ultra-low-cost active multispectral crop diagnostics device", IEEE Sensors, 2017, pp. 1-3.

* cited by examiner

METHOD FOR ADAPTING THE PRINTER PARAMETERS OF A DIGITAL PRINTER

CROSS REFERENCE TO RELATED APPLICATIONS

This application is the United States national phase of International Patent Application No. PCT/EP2022/058387 filed Mar. 30, 2022, and claims priority to European Patent Application No. 21165922.2 filed Mar. 30, 2021, the disclosures of which are hereby incorporated by reference in their entireties.

BACKGROUND OF THE INVENTION

Field of the Invention

The invention relates to a method for adapting the printer parameters of a digital printer, wherein a tone value target having 1 to n tone value fields, wherein n E N, is output on a carrier material and at least a part of the tone value fields is measured in a hyperspectral manner. A digital reference pattern is created from the measurement data. The tone value target is output on a second carrier material and at least a part of the tone value fields is again measured in a hyperspectral manner. A digital pattern is created from the measurement data which is compared to the digital reference pattern. At least one similarity value is ascertained and if the similarity value is outside a specified tolerance range, at least one printer parameter or a combination of multiple printer parameters is adapted. Furthermore, the invention relates to a device for carrying out the method according to the invention.

Description of Related Art

Ink is an essential feature of a printed decoration, which is generated by various technologies, such as gravure printing or digital printing. In each of these technologies, the desired appearance of the print is achieved by superimposing various pigment layers of the primary colors. The gravure printing method is a printing technology in which the elements to be imaged are provided as depressions in a printing form, for example, of a printing roller, which is inked before the printing. The printing ink is predominantly located in the depressions and is transferred due to contact pressure of the printing form and adhesion forces to the object to be printed. In contrast, in digital printing, the printed image is transferred directly from a computer into a digital printer, such as a laser printer or inkjet printer, wherein the use of static printing forms is eliminated. In digital printing, the primary colors cyan, magenta, yellow, and black (CYMK) are typically used. The CMYK color model is a subtractive color model, wherein the abbreviation CMYK stands for the three color components cyan, magenta, yellow, and the black component key as the color depth. A color space (gamut) may be depicted using this color system, which meets many requirements from greatly varying areas.

The printed decorations are applied to carrier materials. For example, paper, glass, metal, films, wooden material panels, in particular MDF or HDF panels, WPC panels, veneers, lacquer layers, plastic panels, and inorganic carrier panels are suitable as carrier materials. Wooden material panels are preferred according to the invention.

Wooden material panels provided with a decoration are often used to produce flooring laminate or in the form of wall and ceiling paneling elements. There are multiple approaches for decorating the wooden material panels. In the past, the coating of wooden material panels with a decorative paper was often used, wherein no limits are set on the diversity of differently-pattern decorative papers. The possibility of directly printing wooden material panels has developed as an alternative to using decorative papers on wooden material panels, wherein printing paper and subsequently laminating or directly coating it on the wooden material panels are eliminated. The printing technologies primarily used for this purpose are the gravure printing method and the digital printing method.

An open problem, which represents a central theme in all areas of the color-based or color-processing industry is achieving a high degree of color fidelity, in other words the ability to reproduce specified colors with minimal chromatic difference in relation to an original, and also to do so in particular on different carrier materials or printed materials. One essential step for this purpose is, inter alia, that a continuous supervision of the printing quality in the entire printing process is ensured. A central quality requirement in all printing methods is in this case that color deviations between an original pattern of a decoration and further prints of the decoration only occur within a specified setpoint value. The printing quality in this context designates how well a print of a decoration corresponds to the original pattern. The greater the correspondence, the higher the printing quality.

The printer used for the printing has a significant influence on the printing quality here. It is known that in the printers used in the digital printing industry, multiple printheads are arranged in a row and each individual one is "responsible" for printing a subsection of a decoration. Furthermore, it is known that the printing behavior of the individual printheads and therefore their printing quality changes over time. The printing behavior designates the printing properties of a printhead, i.e., the density, the printing intensity, and the color strengths which are printed. These printing properties can change irregularly with time.

The printheads are sometimes also used in double rows in the printers, i.e., two printheads are arranged one behind another for a region to be printed. The printing speed can be increased by an increase of the resolution in the printing length or the printing quality by this arrangement. The first printhead prints 50% of the printing medium and the second printhead prints the other 50% of the printing medium in this region. If one of the two printheads fails, the flaw thus resulting is less noticeable, since at least 50% of the printing medium was applied.

To enable a high-quality printed product, the printing behavior of the printheads of a printer has to be monitored and calibrated and/or adapted if necessary. It is known from the prior art that various tone value steps of the printing media, such as the printing colors CMYK are output as so-called tone value fields in a tone value target for this purpose and measured using optical measurement point measurements using a densitometer. These measured values are subsequently used to influence and/or to change and/or to adapt and/or to control the printhead software or the software which manages the print files and/or separation data.

However, the methods known from the prior art have significant disadvantages. The manual point measurements using a densitometer are very time-consuming, since each measurement region has to be measured by hand. Automation of these measurements is not known in the prior art. In addition, when measuring using a densitometer, only a point measurement of the planar tone value field is possible. The information which is contained in the remaining area of the printed tone value field cannot be used, in contrast. Due to the point acquisition, however, inaccuracies in the measurement result can occur. For various reasons, a tone value field does not have a homogeneous coloration under certain circumstances, but rather can also contain color deviations. This can be caused, for example, by an uneven carrier material, a flawed primer layer, or errors during the printing process. If the tone value field is then measured in a punctiform manner at a point which has such a color deviation, an incorrect tone value is thus ascertained for this tone value field. For example, in a tone value field which includes very bright yellow, a dark point or a brightly illuminated point could be measured. In both cases, a tone value for the tone value field would be ascertained which is not representative of this tone value field. This would result in flawed corrections or adaptations in the printing process.

The solely optically based systems from the prior art also have restrictions, since these only work on the basis of the chips and/or sensors integrated therein, which are based on light-sensitive image sensors. In particular, solely optically based systems do not use spectral measurement methods and accordingly include sensors which are not designed for spectral measurements.

Automated supervision and adaptation processes are not possible using these methods.

Furthermore, it is known that in printing processes in which print series are produced, color profiles have to be checked and adapted very often, in general to some extent several times a day, since color spaces change due to various parameters in the printing process. Inter alia, the printing intensity of the printheads, the ink batch used, the paper batch used, or the anilox roll wear have an influence. The supervision of color profiles is carried out by a color management system. Various optical measurement methods and suitable software, for example the Colorgate software from Colorgate, are used for this purpose. Various optical measurement methods are available from the prior art for this purpose, for example, "Cube" from Colorgate and spectral point measuring devices, for example, "X-Rite iOne". The color management system takes influence here on the digital printing data of the decoration to be printed and generally prepares a corrected color profile, in order to correct undesired changes in the printing process. An adaptation and/or calibration of the printing behavior of the printheads of a printer is not provided here.

However, if only color profiles or color spaces are adapted and/or corrected, there is the risk that a specified original pattern can no longer be achieved under certain circumstances. For example, if printheads no longer print as intensively as at the appointed time of the creation of the original pattern, the color management cannot compensate for this. A frequent application of color management can have the result that one moves farther and farther from the actual original state with the correction, which can result in a loss of printing quality. In addition, frequent color management sometimes means a high time expenditure, since all printing data have to be newly occupied with the color profile and separation files have to be created.

Furthermore, the following methods are known from the prior art:

DE 10 2017 202 031 A1 relates to a correction of color deviations in digital printing presses. The goal of the method is to enable a true-color reproduction of a digital template in the printing process. A test pattern is measured in this case using a color measuring device. Due to the use of color measuring devices, a punctiform measurement of the test pattern, with the disadvantages linked thereto, is performed.

EP 3 020 565 B1 relates to a method for producing true-color and true-detail reproductions of a printed decoration using various printing technologies. The subject matter of the method is producing decorative prints on carrier materials having comparable quality appearance, independently of whether the decoration was printed in a digital or analog manner.

SUMMARY OF THE INVENTION

The object of the invention is to provide a method using which the printing quality in a printing process can be increased and the disadvantages of the prior art are eliminated.

The present invention achieves this object by way of a method for adapting the printer parameters of a digital printer, including the following steps a) creating and storing a digital tone value target having 1 to n tone value fields, wherein $n \in N$;

b) outputting the tone value target on a first carrier material under first printing conditions using first printer parameters by way of a first digital printer;

c) measuring at least a part of the tone value target output in step b) in a hyperspectral and planar manner;

d) forming at least one mean value of the hyperspectral data assigned to a region of a tone value field of a tone value target, which is covered by a printhead in the print;

e) calculating colorimetric data and/or color density values from the at least one mean value of the hyperspectral data;

f) creating a digital reference pattern, including at least the colorimetric data and/or the color density values assigned to the region of the tone value field which was used for the formation of the at least one mean value of the hyperspectral data;

g) outputting the digital tone value target on a second carrier material under second printing conditions using second printer parameters by way of the first digital printer or a second digital printer;

h) measuring at least a part of the tone value target output in step g) in a hyperspectral and planar manner;

i) forming at least one mean value of the hyperspectral data assigned to a region of a tone value field of a tone value target which is covered by a printhead in the print;

j) calculating colorimetric data and/or color density values from the at least one mean value of the hyperspectral data;

k) creating a digital pattern, including at least the colorimetric data and/or the color density values assigned to the region of the tone value field which was used for the formation of the at least one mean value of the hyperspectral data;

l) comparing the digital reference pattern to the digital pattern and ascertaining at least one similarity value; and m) adapting at least one printer parameter or a combination of multiple printer parameters of the first or second digital printer if the at least one similarity value is outside at least one specified tolerance range, wherein the printer parameters are selected from the group including separation data, electrical voltage in the printhead, software control of the printer, and temperature.

Furthermore, the invention provides a device, in particular a printing system, which is configured to carry out a method for adapting the printer parameters of a digital printer as claimed in any one of claims 1 to 13. The device according to the invention comprises:

- at least one hyperspectral planar measuring device;
- at least one computing unit;
- at least one first digital printer for printing a tone value target;
- optionally a second digital printer for printing a tone value target;
- optionally at least one means for further processing of a decoration printed on a carrier material.

According to the present method, in a first step a digital tone value target having 1 to n tone value fields is created by suitable software and stored, wherein n E N. The tone value fields of the tone value target include at least a part of the color components of the color system used for the print. Color systems often used in digital printing are, for example, the CYMK color system, the CRYK color system, or also 1-color, 5-color, 6-color, 7-color, or also 8-color color systems. The CRYK color system designates a color system having the color components cyan, red, yellow, and black. The CYMK color system, which is often used, is a subtractive color model, wherein the abbreviation CMYK stands for the three color components cyan, magenta, yellow, and the black component key as the color depth. In one preferred embodiment, the tone value fields of the tone value target include each of the color components of the color system used. Each tone value field of the tone value target preferably includes precisely one color component having precisely one tone value in this case. Each of the above-mentioned color systems can be used in the method according to the invention. The CYMK color system or the CRYK color system is particularly preferably used.

The term tone value relates to the different steps between light and dark of a color component when it is printed on a carrier material, or also in a digital data set. In this case it describes a color value at an image element (point or pixel) or in the case of the color component black, a grayscale within a specified color or grayscale spectrum, specified in 0-100%. In this case 100% means maximum darkness or color coverage (full tone) of the imaging medium; and 0% means complete transparency of the carrier material in the print.

The tone value target particularly preferably includes tone value fields for all color components of the color system used, wherein tone value fields having multiple different tone values are present for each color component.

In one embodiment of the present invention, the tone value target includes, for each color component, between 1 and 500 tone value fields having different tone values, preferably between 10 and 100 tone value fields having different tone values, particularly preferably between 30 and 60 tone value fields having different tone values.

In one embodiment of the present invention, the tone values of different tone value fields of a color component include a linear gradation of the tone values. For example, the tone values can each differ from one another in the range between 0.2% and 100%, preferably in the range between 0.5% and 10%, particularly preferably in the range between 1% and 3%.

Suitable software for creating and storing the digital tone value target, such as Colorgate from Colorgate or Adobe Photoshop is known to a person skilled in the art.

In a further method step, the digital tone value target is output on a first carrier material under first printing conditions using first printer parameters by a first digital printer.

Suitable carrier materials are selected here from the group including paper, glass, metal, films, wood material panels, in particular MDF or HDF panels, WPC panels, veneers, lacquer layers, plastic panels, and inorganic carrier panels.

Printing conditions in the meaning of the invention designate all boundary conditions influencing the printing on a digital printer.

These include in particular:

- ink used (ink batch, producer of the ink),
- carrier material used (batch of the carrier material, producer of the carrier material)
- use of a primer and amount of the primer used,
- viscosity of the liquids used,
- ambient climate, in particular temperature and ambient humidity,
- condition of the surface of the carrier material,
- age and formula of the primer used and/or the ink used.

A primer or also a pretreatment is used to keep color deviations between the printed decorations of a production batch or also between identical printed decorations of different production batches as small as possible from the outset. In addition, the use of a primer reduces the amount of the ink which has to be used for a print. Without primer, the ink, in particular if paper is used as the carrier material, penetrates far into the carrier material under certain circumstances and a larger amount of ink has to be used to achieve a desired printing result. Since the primer is significantly more cost-effective than the printing ink, corresponding cost saving is linked to its use.

Printer parameters in the meaning of the invention designate all parameters in the digital printing process which are directly related to the digital printer used for the printing and have an influence on the printing result. These include in particular:

- printheads of the printer,
- software control of the printer,
- separation data,
- electrical voltage in the printhead,
- temperature of the printer.

According to the method according to the invention, the tone value target is therefore applied under precisely defined first conditions to a first carrier material by a first digital printer. A tone value field can be applied over the entire width of the carrier material and can have a length in the printing direction between 1 mm and 50 mm, preferably between 5 mm and 25 mm, particularly preferably between 10 mm and 15 mm. In this embodiment, multiple tone value fields are preferably applied one behind another in the printing direction to the carrier material.

However, the tone value fields can also be applied only in one region of the carrier material, wherein a tone value field has a width between 0.01 mm and 50 mm, preferably between 0.1 mm and 1 mm, particularly preferably between 0.2 mm and 0.5 mm, with the above-described length dimensions. The tone value fields of the tone value target can therefore be output according to the invention using all printheads of the digital printer used, or only by a part of the printheads of the digital printer used.

In one embodiment of the present invention, multiple tone value fields are applied seamlessly one behind another in the printing direction.

At least a part of the tone value target output in the preceding method step is measured in a hyperspectral manner. That is to say, only a part of all output tone value fields can be measured, or a part of the area of each of the output tone value fields can be measured. In one embodiment of the invention, therefore at least a part of the area of the tone value target output in the preceding method section is measured in a hyperspectral manner.

In one preferred embodiment, at least the area of a tone value field of a tone value target is measured in a planar and hyperspectral manner, which is covered by a printhead in the print. Measured in a planar and hyperspectral manner is therefore to be understood according to the invention to mean that a part of an area of a tone value field of a tone value target is measured in a hyperspectral manner. Preferably, at least the area of a tone value field of a tone value target is measured in a hyperspectral manner which is covered by a printhead in the print. In one embodiment, therefore at least an area of a tone value target having a width between 0.01 mm and 50 mm and a length between 1 mm to 50 mm is measured in a planar and hyperspectral manner. The width is to be understood as the direction corresponding to the printing width of the digital printer and the length is to be understood as the direction corresponding to the print length, thus the direction in which the carrier material passes through the digital printer.

The entire area of each of the output tone value fields is particularly preferably measured. In one embodiment of the present invention, the hyperspectral measurement is carried out once, in a further embodiment of the invention, the hyperspectral measurement is carried out multiple times, preferably 2 to 5 times, particularly preferably 2 to 3 times. The accuracy of the method according to the invention can be further increased by the multiple measurements.

In particular, the entire area of each of the output tone value fields is therefore particularly preferably measured in a planar and hyperspectral manner. In the hyperspectral planar measurement, an area is therefore measured in a hyperspectral manner which extends significantly beyond the extension of a point in the print (point measurement).

According to the invention, a planar section of an analog reference pattern is measured using a hyperspectral planar measuring device. The data are subsequently stored. The hyperspectral planar measuring device carries out a hyperspectral planar measurement, for which a hyperspectral sensor system is used.

A "hyperspectral sensor system" is understood as a sensor system which can record images of very many wavelengths close to one another. The eye sees the surroundings in a multispectral manner in the wavelengths of the primary colors red, green, and blue. Hyperspectral systems record data from 20 to 250 different channels, which extend from wavelengths in the ultraviolet range up to the long wave infrared. The advantage of hyperspectral systems is that images are recorded and stored with a very high detail accuracy and resolution.

The measurement of location-resolved spectroscopic information, in particular by spectroscopic cameras, is known, for example, from imaging spectroscopy. A multispectral or a hyperspectral image, for example, can be recorded in a location-resolved manner for this purpose. The multispectral image is distinguished here in that multiple discrete wavelength ranges (bands) are used, wherein the individual bands do not adjoin one another. Therefore, location-resolved data can be measured selectively for specific discrete wavelength ranges within a specified spectral range. In hyperspectral imaging, multiple wavelength ranges are also used, in contrast to multispectral imaging, however, the wavelength ranges are continuous and adjoin one another. Location-resolved data are thus measured over the entire spectral range used [C. Veys et al., "An Ultra-Low-Cost Active Multispectral Crop Diagnostics Device", Paper published at the IEEE Sensors 2017 Conference, Glasgow, UK, https://doi.org/10.1109/ICSENS.2017.8234211]. Both methods are among the spectral imaging methods, but include specific features in which they differ. Hyperspectral imaging and multispectral imaging can therefore be understood as subgroups of spectral imaging.

Hyperspectral surface measurement can be carried out by means of a hyperspectral system, for example using a hyperspectral camera or particularly preferably by means of a hyperspectral scanner. Hyperspectral measurement systems have already been developed since the middle of the 1980s by NASA in the context of the "Airborne Imaging Spectrometer (AIS)" and therefore have already been known to a person skilled in the art for a long time [W. C. image-based geological expert system-development Chiou, "NASA project for hyperspectral image-analysis", App. Opt. 24 (14), 2085-2091 (1985)]. There are various possibilities obtaining hyperspectral images, one widespread one which is used is the push broom method, with the aid of which spectral and location information is obtained using a surface sensor [M. Michelsburg, "Materialklassifikation in optischen Inspektionssystemen mithilfe hyperspektraler Daten [material classification in optical inspection systems with the aid of hyperspectral data]", Dissertation, Karlsruher Institut fur Technologie KIT, 2014, DOI: 10.544/KSP/1000043415]. This method has already been applied since 2007 in the area of color measurement on decorative surfaces in the color measurement system ACMS® from IPAC and since 2019 in the color measurement system ICMS® from IPAC ["IPAC—Advanced Colour Management System", Druckerstammtisch Hochschule der Medien Stuttgart [printer round table of the Stuttgart college of media], Apr. 5, 2016; "Erste Inline-Farbmessung in Betrieb [first in-line color measurement in operation]", Material+Technik Möbel 06|19, P. 43, www.material-technik. de/e-magazine/material-technik-moebel-06-19].

A corresponding method for generating hyperspectral images is known in the prior art as ACMS® (Advanced Color Measurement System). Hyperspectral systems have a large number of detectors. A hyperspectral data cube having two spatial and one spectral dimension results as the product of the recording. Four fundamental technologies are available for generating this hyperspectral data cube. The entire data set is supplied using a single detector output by a so-called snapshot. With spatial scanning, each detector output supplies the spectrum of a narrow strip of the template. In spectral scanning, each detector output supplies a monochromatic spatial map of the template. In spatial-spectral scanning, each detector output supplies a spectrally coded spatial map of the template. Known systems are the hyperspectral surface measuring devices ACMS® and ICMS® from IPAC, wherein the ACMS® is used off-line in the printing process and the ICMS® is used in-line in the printing process.

The hyperspectral planar measurement has the advantage that a template is measured by means of hyperspectral planar measurement and subsequently a mean value of the measured data is computed. This mean value of the measured data is representative of the template measured in a hyperspectral manner. The entire template can be measured in sections by means of hyperspectral planar measurement, wherein a mean value of the associated data is computed for each section. The individual sections adjoin one another here but have no overlap with one another.

A part of the area of a tone value field or the entire area of a tone value field can therefore advantageously be measured in a hyperspectral manner using the method according to the invention, wherein a mean value is formed from the measured data. This mean value is then representative of the measured tone value field.

Preferably, an area of the tone value field having a width between 0.01 mm and 50 mm, preferably between 0.1 mm and 1 mm, particularly preferably between 0.2 mm and 0.5 mm and a length between 1 mm and 50 mm, preferably between 5 mm and 25 mm, particularly preferably between 10 mm and 15 mm is used to form a mean value from the hyperspectral measurement data ascertained for this area. The width is to be understood as the direction corresponding to the printing width of the digital printer and the length as the direction corresponding to the printing length, thus the direction in which the carrier material passes through the digital printer.

In one preferred embodiment, at least one mean value of the hyperspectral data is formed assigned to a region of a tone value field of a tone value target, wherein the region of a tone value field of a tone value target is covered by a printhead in the print.

In one particularly preferred embodiment, mean values of the hyperspectral data are formed assigned to various regions of tone value fields of a tone value target, wherein the various regions of the tone value fields of a tone value target are each covered by a printhead in the print. In this embodiment, the mean value for various areas of the tone value fields is thus ascertained in each case, wherein each of these areas of the tone value fields was printed by a printhead of the digital printer. The mean values for the various areas of the tone value fields of the tone value target are therefore each assigned to the printhead which has printed the respective area of the tone value field.

According to the invention, the hyperspectral data of multiple areas of the tone value field can therefore be evaluated for a tone value field, so that for each region respective mean values of the measurement data are formed. The individual regions preferably adjoin one another, but do not overlap. The size of each region which is used for the mean value formation particularly preferably corresponds to the region which is covered by a printhead in the print. In this embodiment, mean values of the hyperspectral measurement of a tone value of a tone value field can then be assigned to each printhead. It is therefore possible to check the printing quality of each printhead in the printer used.

According to the invention, therefore all printheads can be checked or also only selected printheads, depending on which regions of the tone value fields of the tone value target are used for the mean value formation. A mean value of the hyperspectral data is therefore formed for at least one region of a tone value field of a tone value target which is covered by a printhead in the print. In one embodiment of the present invention, a mean value of the hyperspectral data is formed for each region of each tone value field of a tone value target which is covered by a printhead in the print. A mean value for each of the 1 to n tone value fields of a tone value target is therefore formed assigned to each printhead.

The formation of the mean values therefore takes place according to the invention assigned in each case to the printheads used for the print of this area in the output of the tone value target, that is to say, a mean value can therefore be assigned to at least one printhead. Therefore, at least the area of a tone value field is measured in a planar and hyperspectral manner which is used for the formation of the at least one mean value.

In one embodiment of the present invention, the mean values can be formed not only assigned to the printheads, but rather even assigned to the individual nozzles of the printheads. In this way, an adaptation of printer parameters is possible which has an effect on individual nozzles of the printheads, for example, the control of the electrical voltage of individual printer nozzles.

The selection of the area which is used for the formation of a mean value can be performed in one embodiment of the invention by a specification of the width and length of the area. Specifications about the size of the area were already made. In a further embodiment of the invention, the area which is used for the formation of a mean value can be determined by position marks on the carrier material. In a further embodiment of the invention, the area which is used for the formation of a mean value can be determined by counters and/or measuring units on the traverse. The position marks, counters, and/or measuring units are identified in the hyperspectral planar measurement. In each case, an area which is used for the formation of a mean value can be reliably assigned to a printhead by the described method.

Colorimetric data can be ascertained from the measurement data of the hyperspectral planar measurement by suitable software and/or color density values can be ascertained. Suitable software is known to a person skilled in the art and is generally also comprised in the hyperspectral surface measuring device.

In one embodiment of the invention, colorimetric data and/or color density values are ascertained from the at least one mean value of the hyperspectral data.

In one preferred embodiment of the invention, colorimetric data and/or color density values are ascertained from each mean value of the hyperspectral data.

In colorimetry, three measured values are used to identify a color. Colorimetry characterizes a color in this case by coordinate specifications in a specified color space. Color spaces which are often used are, for example, the L*a*b* color space and the L*C*h* color space. The coordinates of the two color spaces can each be converted into one another by simple mathematical transformations. This principle is well known to a person skilled in the art. The use of colorimetry offers numerous advantages, since it offers an objective and method-neutral possibility for assessing a color. Furthermore, it is possible using colorimetry to characterize even very bright colors or tone values with great accuracy.

In one preferred embodiment, the L*, a*, and b* values in the so-called L*a*b* color space are ascertained from the data of the hyperspectral planar measurement as colorimetric data. The L*a*b* color space is a color space which covers the range of the perceptible colors. The L*a*b* color space is described by a three-dimensional coordinate system. The L* axis describes the brightness (luminance) of the color using values from 0 (black) to 100 (white). The a* axis describes the green or red component of a color, wherein negative values stand for green and positive values stand for red. The b* axis describes the blue or yellow component of a color, wherein negative values stand for blue and positive values stand for yellow. The scales of the a* axis and the b* axis comprise a number range from −150 to +100 and −100 to +150. According to the method according to the invention, a L*, a*, and b* value is then computed for each region of a tone value field for which averaging of the hyperspectral data has taken place.

In a further embodiment, color density values are ascertained from the data of the hyperspectral planar measurement by suitable software. The color density values can typically be computed for arbitrary filter norms. Suitable software is known to a person skilled in the art and is generally also comprised in the hyperspectral surface measuring device. According to the method according to the invention, a color density value is then computed for each region of a tone value field for which an averaging of the hyperspectral data has taken place. If color density values are ascertained in the method according to the invention, these can advantageously be compared to the measurement results of a conventional densitometer.

In a further embodiment of the present invention, both colorimetric data, in particular $L^*a^*b^*$ values, and also density values are ascertained from the hyperspectral data for a tone value field.

A digital reference pattern is created from the hyperspectral data of the output tone value target. This reference pattern contains the colorimetric data, in particular the $L^*a^*b^*$ values and/or the color density values assigned to the regions of the tone value fields which were used for the formation of the respective underlying mean values of the hyperspectral data. Via the assignment to the regions of the tone value fields used for the mean value formation, as already described, an assignment of the individual colorimetric data, in particular the $L^*a^*b^*$ values, and/or the color density values to the printheads of the printer is possible.

In one embodiment of the present invention, a digital reference pattern is created, including the colorimetric data and/or the color density values assigned to the region of the tone value field, which was used for the formation of the at least one mean value of the hyperspectral data.

In one preferred embodiment, a digital reference pattern is created, including the colorimetric data and/or the color density values assigned to the regions of the tone value fields which were used for the formation of the mean values of the hyperspectral data.

Therefore, according to the invention, colorimetric data and/or color density values are created assigned to at least one printhead or multiple printheads of the digital printer for one or more tone value fields. In one embodiment of the invention, colorimetric data and/or color density values are created for each printhead for each of the 1 to n tone value fields of a tone value target.

The method according to the invention therefore has the advantage in particular that the tone values of a printed tone value target are not only acquired in a punctiform manner, as using methods known from the prior art, but rather a planar measurement is performed. According to the invention, mean values, which then represent the tone value of a region of the tone value field, are formed from the measurement data from the area measured in a hyperspectral manner. Inaccuracies due to inhomogeneous coloration of the printed tone value field can thus be avoided. The accuracy in the determination of the tone value of a region of the tone value field is significantly increased in this way.

Advantageously, not only a solely optical system is used for the measurement of the printed tone target, but rather a hyperspectral surface measuring device. Optical measurement systems only offer restricted possibilities for acquiring the tone values due to the parameters of the chips and sensors used. A hyperspectral surface measuring device acquires significantly more measurement data and thus in turn increases the data quality for the further method steps. The solely optical system operates as already described without hyperspectral measurement and therefore using sensors and chips which are designed for this type of the measurement. In contrast, the chips and sensors used for hyperspectral measurement are again specially designed for this measurement technology.

According to the method according to the invention, the digital tone value target is output on a second carrier material under second printing conditions using second printer parameters by the first digital printer or a second digital printer.

At least a part of the tone value target output in preceding method step g) is again measured in a planar and hyperspectral manner. The same tone value fields and the same regions of the tone value fields are particularly preferably measured in a hyperspectral manner which were also measured in method step c). The hyperspectral data are evaluated as already described, wherein the same regions of the tone value fields are preferably used for the formation of the mean values as in method step c).

Colorimetric data, in particular $L^*a^*b^*$ values, and/or color density values are computed from the data of the hyperspectral planar measurement, as already described. Colorimetric data, in particular $L^*a^*b^*$ values, are preferably computed if they are comprised in the digital reference pattern or color density values are computed if they are comprised in the digital reference pattern or colorimetric data, in particular $L^*a^*b^*$ values, and color density values are computed if both are comprised in the reference pattern. A digital pattern is created from the computed colorimetric data, in particular $L^*a^*b^*$ values, and/or color density values assigned to the regions of the tone value fields which were used for the formation of the respective underlying mean values of the hyperspectral data. Through the assignment to the regions of the tone value fields used for the mean value formation, an assignment of the individual colorimetric data, in particular the $L^*a^*b^*$ values, and/or the color density values to the printheads of the printer is again possible.

In one preferred embodiment
  in method steps d) and i), mean values of the hyperspectral data are formed assigned to various regions of tone value fields of a tone value target, wherein the various regions of the tone value fields of a tone value target are each covered by a printhead in the print;
  in method steps e) and j), colorimetric data and/or color density values are calculated from each mean value of the hyperspectral data;
  in method step f), a digital reference pattern is created, which includes the colorimetric data and/or the color density values assigned to the regions of the tone value fields which were used for the formation of the mean values of the hyperspectral data; and
  in method step k), a digital pattern is created, which includes the colorimetric data and/or the color density values assigned to the regions of the tone value fields which were used for the formation of the mean values of the hyperspectral data.

According to the invention, the digital reference pattern and the digital pattern are compared to one another and at least one similarity value is ascertained. The comparison can be carried out in an automated manner by means of software or manually by a user. Suitable software for carrying out the comparison in an automated manner, such as the software Colorgate from the company of the same name or software from IPAC (Improve Process Analytics and Control GmbH), is known to a person skilled in the art. The colorimetric data and/or the color density values are each compared to one another here, which can be assigned to the same region of a tone value field and thus also to the same printhead/printheads. That is to say, the measurement data of two tone value fields or regions within two tone value fields having identical position in the tone value target are compared to one another.

In one embodiment of the present invention, the measurement data are preferably accurately ascertained to at least 4 decimal places and compared with the corresponding accuracy.

If colorimetric data are comprised in the digital reference pattern and in the digital pattern, they are compared directly to one another in one embodiment. If the colorimetric data are L*a*b* values, an L* value of the digital reference pattern and an L* value of the digital pattern are each compared to one another. This takes place similarly for the a* and b* values. The comparison thus results in a possible deviation of one of the colorimetric values, in particular one of the L*a*b* values. This deviation represents the similarity value in this embodiment and can be specified in absolute numbers or also as a percentage. Both values can be converted into one another by simple mathematical operations. The results of the comparison each represent the similarity value in this embodiment for the region of the tone value field underlying the averaging of the hyperspectral data.

In a further embodiment, in the comparison the color distance ΔE between an L*a*b* value of the digital reference pattern and an L*a*b* value of the digital pattern is computed as a similarity value. The color distance is defined as the Euclidean distance of the color coordinates. The color distance ΔE is specified as an absolute number and is visually assessed by an observer as follows in general:

| ΔE | Visual assessment |
|---|---|
| 0.0-0.5 | Nearly unnoticeable |
| 0.5-1.0 | Noticeable to the trained eye |
| 1.0-2.0 | Slight color difference |
| 2.0-4.0 | Perceived color difference |
| 4.0-5.0 | Significant, rarely tolerated color difference |
| Above 5.0 | The difference is assessed as a different color |

In this embodiment, the calculated color distances each represent the similarity value for the region of the tone value field underlying the averaging of the hyperspectral data.

If color density values are comprised in the digital reference pattern and in the digital pattern, they are directly compared to one another in one embodiment. The comparison thus results in a possible deviation of one of the color density values of the digital pattern from a color density value of the digital reference pattern. This deviation can be specified in absolute numbers or also as a percentage. Both values can be converted into one another by simple mathematical operations. The results of the comparisons each represent the similarity value in this embodiment for the region of the tone value field underlying the averaging of the hyperspectral data.

In a further embodiment, similarity indices can also be output upon the comparison of the digital reference pattern to the digital pattern. Very generally, the similarity index represents the deviation between two measured values. The greater the similarity index is, the less the measured values, which are compared to one another, deviate from one another. The similarity comparison is carried out by software on a computing unit. If the ACMS® method is used for the hyperspectral planar measurement, the similarity comparison can advantageously take place via the similarity index of the associated software. This application is known to a person skilled in the art.

The greater the similarity indices are, the less the digital reference pattern and the digital pattern or the data of the digital reference pattern and the digital pattern compared to one another deviate from one another and therefore the more color-true the digital pattern is accordingly to the digital reference pattern and vice versa. The colorimetric data, in particular the L*a*b* values and/or the color density values are also compared to one another in the computation of the similarity indices. A similarity index of 100% means that there are no deviations between an L*a*b* value of the digital reference pattern and of the digital pattern and both are identical to one another. The tone value fields of the tone value target output in method step g) can for different reasons have both a higher and a lower tone value with respect to its tone value printed on the carrier material in comparison to the tone value fields of the tone value target printed in method step b). Both higher and lower tone values are reflected in the determination of the similarity index in a similarity index which is less than 100%. In this embodiment, the at least one similarity index represents the at least one similarity value.

According to the invention, the at least one similarity value can therefore be present as a deviation between colorimetric data, in particular L*a*b* values and/or as deviations between color density values and/or as a color distance ΔE and/or as a similarity index.

In a further embodiment, the comparison can also be carried out manually by a user and is carried out here based on the experience of the user. The user can then initiate further measures on the basis of the comparison result.

According to the method, at least one printer parameter or a combination of multiple printer parameters of the first or second digital printer is adapted if the at least one similarity value is outside at least one specified tolerance range.

The tolerance range is defined on the basis of the quality demand for the respective printing process and the colors contained therein and is thus flexibly adaptable to the respective requirements. Individual demands of a customer for the printing quality of a print job can thus also be taken into consideration. In one embodiment, a tolerance range is specified for all tone value fields. In a further embodiment, different tolerance ranges are specified for different tone value fields. The fact can be taken into consideration by the latter embodiment that differences in the coloring are not perceived with the same sensitivity for each tone value step by an observer.

In one embodiment of the present invention, the at least one tolerance range is defined as a function of the decoration and the colors contained therein. The demand of a customer for the color-true reproduction of a decoration can also be taken into consideration by the selection of the tolerance range.

If the at least one similarity value is provided as a deviation between colorimetric data, in particular L*a*b* values, and/or as deviations between color density values, the tolerance range is preferably specified in %. The tolerance range is between 0% and ±5%, preferably between 0% and ±3%, particularly preferably between 0% and ±0.5% according to the invention. Since a deviation of the color density values and/or the colorimetric data can be present both in the positive and in the negative direction, the tolerance range is specified as a ±range.

If the at least one similarity value is provided as a color distance ΔE, the tolerance range is thus specified in absolute numbers. In one embodiment, the tolerance range here is between 0.0 and 1, preferably between 0.0 and 0.5, particularly preferably between 0.0 and 0.1.

If the at least one similarity value is provided as a similarity index, the tolerance range is thus preferably specified in %. In one embodiment the tolerance range here is between 75% and 100%, preferably between 95% and 100%, particularly preferably between 99.5% and 100%.

The adaptation of the at least one printer parameter or a combination of multiple printer parameters of the first or second digital printer can take place automatically or manually according to the invention here.

The printer parameters which are adapted are preferably selected from the group including separation data, electrical voltage in the printhead, temperature, and the software control of the printer. The printer parameters separation data and/or electrical voltage in the printhead are particularly preferably adapted.

If a decoration is to be printed, a separation file is thus created at the beginning of the printing process, in which the decoration is decomposed into the primary colors to be printed. The separation data are generated here for the color system used in the print, for example, for the CMYK color system from the print file of the decoration. Printing data, which are then in turn assigned to the print heads, are created in this case by means of software starting from a print file, containing a multicolored decoration or a decoration in grayscales, for each color component of the color system. The printing data for each color component of the color system used for decoration are called separation data.

The separation data accordingly contain the information in which sequence which tone values of a color component are to be printed. The tone values can at most be printed here as exactly as technically permitted by the resolution of the printhead, thus the number of the nozzles in the width. In some printheads, a resolution down to a few pixels is accurately possible. The resolution is furthermore determined by the separation data. Therefore, a lower resolution in the printing of a tone value of a color component can also be specified by the separation data. The tone value of a tone value field in the printing of the tone value target can thus be influenced by the adaptation of the separation data. The separation data thus offer a possibility of accurately setting the tone value of a tone value field of a color component down to a few pixels. This also has an effect on the printing quality in the later printing of a decoration.

It is advantageously possible to apply a software filter to the separation data by suitable software. In this embodiment, the software control of the printer is influenced and therefore the printer parameters. In this way, the separation data are not changed directly, but rather only the matching software filter is computed. This then influences the tone value which is printed. For example, the cyan tone value step for selected printheads can be lowered by means of the software filter from 10% to 8%. The cyan tone values are then printed by these printheads with a tone value lower by 2% than specified in the separation data. This embodiment has the advantage that the separation data do not have to be completely recomputed and the computation of the software filter can be carried out at a high speed.

In a further embodiment of the invention, the separations as such can also be recalculated by software, which is accompanied by a higher data expenditure, however.

In a further embodiment, the electrical voltage at the printhead is controlled. The printing behavior in the area of the density of the color application during printing and thus the tone value of the printed colors changes due to reducing or increasing this voltage. Printheads are known here from the prior art in which the electrical voltage may only be set as a whole, i.e., globally for the entire printhead (e.g., Fuji Samba having a printhead width of 43 mm). Furthermore, printheads are also known which are divided into multiple regions and the electrical voltage of which is individually activatable. It is also possible to control the electrical voltage of individual nozzles of a printhead. One example of this are some printheads from Kyocera. These are subdivided into 4 units which each have a printing width of approximately 2.5 cm and may be activated individually with respect to the electrical voltage. It is therefore possible to control by way of the electrical voltage at a printhead with which intensity an individual nozzle of a printhead, a region of a printhead, or the entire printhead prints a printing medium.

A further printer parameter is, for example, the temperature of the printer, which can be adapted to change a tone value during the printing. At low temperatures, the color is weaker or paler since the color does not dry correctly during application and thus subsides into the carrier material. If the temperature is too high, precisely the reverse case occurs and the color is too intense.

In a further embodiment of the present invention, it is also possible that a combination of multiple printer parameters is adapted. In one preferred embodiment of the present invention, both the separation data are adapted and the electrical voltage at the printhead is controlled. The change of the separation data by means of software can be used here to adapt the tone values very uniformly. This can take place down to an accuracy of a few pixels in the print. In parallel, a rougher setting can be performed or the density of the color application during the printing can be changed for the entire activatable region of the printhead by the control of the electrical voltage at the printhead.

The control of the electrical voltage of the printhead is particularly advantageous if previously the tone values of the individual tone value fields were set in relation to one another in a desired gradation, for example, by an adaptation of the separation data. That is to say, adjacent tone value fields of a color component each differ in their tone value by 2.5%, for example. The density of the color application during the printing can then advantageously be increased or decreased for all tone value fields of the tone value target at once by a defined amount by the control of the electrical voltage of the printhead, wherein the tone values of the tone value fields are also increased or decreased by a defined amount. This can be advantageously used above all in the correction of color drift during a printing process.

Since tone value steps may be equalized and changed using the method according to the invention, other influences in the printing process, such as variations in the ink batch or in the carrier materials can also be compensated for.

In one embodiment of the present invention, a part of the unprinted carrier material can be measured in a hyperspectral manner, the tone value step 0% is then assigned to the measured values of the unprinted carrier material. In comparison to the tone value fields of the tone value target measured in a hyperspectral manner, using suitable software, the influence of the coloration of the carrier material on the measurement results of the hyperspectral measurement of the tone value fields of the tone value target can then be calculated out. The absolute density values thus obtained can advantageously, for example, be compared to measured values of a measurement using a densitometer. In one embodiment of the present invention, a part of the unprinted carrier material is therefore also measured in a hyperspectral manner.

In one embodiment of the present invention, furthermore at least one signal can be output if the at least one similarity value is outside a specified tolerance range. The at least one signal can be output either in an automated manner or initiated by a user. A suitable signal can be an optical or also an acoustic signal. This can be, for example, an acoustic signal output, such as a warning tone or alarm tone, and/or also an optical signal on a display. In a further embodiment of the present invention, an interruption of the printing process is also linked to the output of the signal. The signal can emphasize a notification of an undesirably large deviation of the digital pattern from the digital reference pattern.

In a further embodiment, a signal takes place in the form of a notification for changes to be performed to the printer parameters in a following printing process. This notification can be displayed on a display screen, for example.

In one embodiment of the present invention, the first printing conditions and the second printing additions and the first and the second carrier material in the method according to the invention are identical. By way of this embodiment, it is possible to perform a quality check in a printing process which takes a long time. In this case, method steps g) to m) are carried out spaced apart in time from method steps a) to f). The output of the tone value target on the second carrier material is carried out here by the first printer, using which the tone value target was also output on the first carrier material. By way of this embodiment, it is possible to carry out a quality check of a printer over a specified time span. Changes in the printing quality are recognized immediately upon the comparison of the digital pattern to the digital reference pattern. If the at least one similarity value should lie outside a specified tolerance range, this can be counteracted by an adaptation of a printer parameter or a combination of printer parameters.

In one embodiment of the present invention, method steps g) to m) are run through until the at least one similarity value is within the specified tolerance range. By way of this embodiment, it is possible to check the performed adaptations in a printer parameter or in a combination of printer parameters and the effects thereof.

In a further embodiment of the present invention, method steps g) to m) are repeated after a specified time. In this embodiment, it is possible to perform a check of the printing quality again and again at predetermined time intervals. For example, the printing quality of a printer can thus be monitored hourly or daily. Changes in the printing quality are recognized immediately upon comparison of the digital pattern to the digital reference pattern. If the at least one similarity value should be outside the specified tolerance range, this can be counteracted by an adaptation of a printer parameter or a combination of printer parameters.

In one embodiment of the present invention, a decoration is printed onto the second carrier material adjacent to the tone value target, wherein the decoration is printed onto the second carrier material using the same digital printer as the tone value target.

In this embodiment, the tone value target is printed during the decoration printing on a carrier material. For this purpose, for example, the tone value target can be printed onto the carrier material in one or also in both edge regions during the decoration printing. If this is carried out at time intervals or also continuously, a deviation of the tone values of the tone value fields be immediately can ascertained and corresponding adaptations can be performed. Even if only printheads in the edge region of the carrier material can be monitored in this case, in this manner a color drift occurring in the printing process can be rapidly detected. This embodiment is thus used for the continuous quality control in a printing process.

In one embodiment of the present invention, after the adaptation of at least one printer parameter or a combination of multiple printer parameters, a decoration is printed onto the second carrier material, wherein the decoration is printed onto the second carrier material using the same digital printer as the tone value target.

It is ensured by the adaptation of the printer parameters that a decoration printing can take place using the digital printer used in the desired quality. Following the adaptation of a printing parameter or a combination of printer parameters, a decoration printing can therefore immediately be applied with the desired printing quality to the carrier material.

In a further embodiment of the present invention, the tone value target is printed using a first digital printer on a first carrier material and using a second digital printer on a second carrier material. The printer parameters of the second digital printer are then preferably adapted such that the at least one similarity value is within a predetermined tolerance range. In this way, it is possible that the printing quality of the second digital printer is adapted to the first digital printer. The tone values output by the second digital printer during the printing of the tone value target are therefore calibrated to the tone values output by the first digital printer during the printing of the tone value target. The first and the second digital printer can therefore subsequently print decorations on the type of carrier material used during the calibration with the same quality, wherein the printing conditions also have to be consistent. This calibration can be repeated again and again in the course of the printing process, by which a quality control is completed at the same time.

The method according to the invention can be integrated into a printing process both in-line and off-line.

In a further embodiment of the method, the method furthermore comprises the following steps:
n) optionally creating and outputting a further tone value target on a carrier material using a first or second digital printer, wherein each tone value field of the tone value target is output over the entire width of the carrier material;
o) recording at least one image of the tone value target output in method step g) or in method step n) using an optical camera system;
p) computing the L* values for each region of a tone value field from the at least one image which can be assigned to a printhead;
q) computing calibration factors using the L* values from the at least one image and the L* values of the digital reference pattern;
r) comparing the calibration factors and computing at least one similarity value; and
s) adapting at least one printer parameter or a combination of multiple printer parameters of the first or second digital printer if the at least one similarity value is outside at least one specified tolerance range.

In one embodiment, a further tone value target is optionally created and output on a carrier material using a first or second digital printer. The tone value target comprises tone value fields here which extend over the entire width of the carrier material. Various tone values of a color component are arranged one behind another in the printing length here. The further tone value target includes the same tone values of the color components as the tone value target which was created in method step a). The printer parameters, printing conditions, and the carrier material used are the same here as in method steps b) and g).

If the tone value target, which was created in method step a), already comprises tone value fields that are printed on the entire width of the carrier material, the step is thus omitted of outputting a further tone value target on a carrier material using a first or second digital printer, wherein each tone value field of the tone value target is output over the entire width of the carrier material.

In this embodiment, at least one image of the tone value target output in method step g) or in method step n) is recorded using an optical camera system.

The optical camera system can comprise one or more individual cameras here. If multiple individual cameras are used, the individual images thereof are preferably combined by suitable software to form an overall image. The overall image can thus comprise the image of one camera or also the combined individual images of multiple individual cameras. The at least one image or the overall image preferably depicts all tone value fields of the tone value target here which were output. In a further embodiment, the at least one image or the overall image only depicts a part of the tone value fields of the tone value target which were output.

Each tone value field of the tone value target or the further tone value target particularly preferably includes the entire width of the carrier material in this embodiment. Various tone value fields are then arranged one behind another viewed in the printing length. According to the invention, multiple regions of the tone value field can therefore be evaluated for a tone value field. The individual regions preferably adjoin one another, but do not overlap. The size of each region particularly preferably corresponds to the region covered by a printhead in the print. In this embodiment, colorimetric data of the tone value field can then be assigned to each printhead. It is therefore possible to check the printing quality of each printhead in the printer used. The colorimetric data should be identical for each region of a tone value field in the ideal case.

In this embodiment, from the overall image for each region of a tone value field which can be assigned to a printhead, L* values are computed from the at least one image. Software which is capable of computing L* values from an image which was recorded using an optical camera is known from the prior art.

Calibration factors are then computed from the L* values from the at least one image and the L* values of the digital reference pattern in that the ratios of the L* values of identical printhead regions to one another are calculated. Each two calibration factors are then compared to one another and a similarity value is computed from their deviation. A calibration factor which is assumed to be correct has to be used as the reference for the computation of the similarity value. For this purpose, the calibration factor is used which is computed for the L* values of the printheads already adapted in method steps a) to m). All further calibration factors within a tone value field are each compared to this calibration factor and a similarity value is ascertained. The similarity value is preferably specified in % here. If the similarity value is outside a specified tolerance range, at least one printer parameter or a combination of printer parameters is adapted.

According to the invention, the tolerance range in this embodiment is preferably specified in %. According to the invention, the tolerance range here is between 0% and ±5%, preferably between 0% and ±3%, particularly preferably between 0% and ±0.5%. Since a deviation can be present both in the positive and in the negative direction, the tolerance range is specified as a ±range.

In this embodiment, the exact measured values of the L* values of the hyperspectral planar measurement can advantageously be used to calibrate L* values of regions of the tone value fields which were exclusively recorded using the optical camera system. In one embodiment, a tone value target is created in method step a), which includes tone value fields which are not printed over the entire width of a carrier material, but only in an edge region of the carrier material. The tone value target is therefore only printed by a part of the printheads. Very exact L* values can be ascertained from this tone value target from the hyperspectral planar measurement and a digital reference pattern can be created. By repeated printing of the tone value target from method step a) and hyperspectral measuring, a digital pattern can be created which also comprises L* values. It can be determined by the computation of the similarity values whether an adaptation of a printer parameter or a combination of printer parameters is necessary. These printheads are thus adapted.

In this embodiment, a further tone value target is created which includes the same tone values as the tone value target from method step a). The tone value fields now have a width, however, which extends over the entire width of the carrier material. The further tone value target is printed on a carrier material and at least one image is recorded using an optical camera system. The at least one image or an overall image preferably depicts the entire further tone value target. A part of the further tone value target was printed here by the printheads which were already adapted by method steps a) to m).

Furthermore, in this embodiment, an L* value is computed by suitable software from the at least one image or the overall image for each region of a tone value field which can be assigned to a printhead. Calibration factors can now be computed from the L* values of the digital reference pattern and the L* values of the at least one image. The calibration factors are each computed for the individual regions of the tone value field which can be assigned to a printhead. A calibration factor, which is assumed to be correct, has to be used as a reference for the computation of the similarity value. The calibration factor is used for this purpose which is computed for the L* values of the printheads already adapted in method steps a) to m). All further calibration factors within a tone value field are each compared to this calibration factor and a similarity value is ascertained. If the similarity value is outside a specified tolerance range, at least one printer parameter or a combination of printer parameters is adapted.

This embodiment thus connects the advantages of the hyperspectral planar measurement to an optical camera system. An adaptation of the printer parameters can then be performed over the entire width of the carrier material, wherein the hyperspectral data are used for calibration for the data of the optical camera system.

In a further embodiment of the present invention, the tone value target from method step a) is a tone value target which includes tone value fields that extend over the entire width of the carrier material. Various tone values of a color component are then arranged one behind another in the printing length. In this embodiment, the tone value target is applied to the carrier material and measured in a planar and hyperspectral manner in the edge region. A digital reference pattern which includes L* values is created from the hyperspectral measurement. The tone value target is again applied to a carrier material and the same region is again measured in a hyperspectral manner. A digital pattern is created from these measured values, which also includes L* values. It can now be ascertained by the computation of the similarity values when an adaptation of one printer parameter or a combination of printer parameters is necessary. The printheads which were used for the printing of the regions of the tone value fields which were subsequently measured in a hyperspectral manner are thus adapted.

Subsequently, in this embodiment at least one image of the tone value target which was printed in method step g) is recorded using an optical camera system. The at least one image or an overall image depicts the entire tone value target.

Furthermore, an L* value is computed by suitable software from the at least one image or the overall image for each region of a tone value field which can be assigned to a printhead. Calibration factors can now be computed from the L* values of the digital reference pattern and the L* values of the at least one image. The calibration factors are each computed for the individual regions of the tone value field which can be assigned to a printhead. A calibration factor, which is assumed to be correct, has to be used as a reference for the computation of the similarity value. The calibration factor which is computed for the L* values of the printheads already adapted in method steps a) to m) is used for this purpose. All further calibration factors within a tone value field are each compared to this calibration factor and a similarity value is ascertained. If the similarity value is outside a specified tolerance range, at least one printer parameter or a combination of printer parameters is adapted. Therefore, all printheads can be adapted although the entire tone value target was not measured in a hyperspectral manner.

Numerous advantages over the prior art result by way of the method according to the invention:

The time-consuming density point measurement, which is carried out by hand, is completely eliminated.

Inaccuracies in the measurement of the tone values of the output tone value target are minimized since a planar hyperspectral measurement takes place, in which mean values are formed from the measured data. Inhomogeneities of the coloration of the tone value fields are therefore equalized (erroneous light or dark points).

A hyperspectral measurement system is used instead of a solely optical measurement, which is solely based on the use of chips and sensors. The solely optical measurement does not comprise a hyperspectral measurement and the chips and sensors thereof are accordingly also not designed for a hyperspectral measurement or suitable for it.

An automated supervision and adaptation process is enabled by the method according to the invention.

Color profiles or color spaces are not adapted and/or corrected, i.e., influence is not taken on the print file of the decoration to be printed, but rather the printer parameters. If solely the color profiles or color spaces of a printed decoration are adapted, there is the risk that the desired printing quality can no longer be achieved. This occurs, for example, if printheads no longer print as intensely as at the point in time of the first profiling. It is not possible to compensate for this by color management, but rather only by an adaptation of the printer parameters.

Frequent color management can have the consequence that the printing result moves farther and farther away from the actual original state with each correction, which results in a loss of the printing quality. This is avoided by the method according to the invention.

Furthermore, the frequent color management is eliminated, with which mostly a high time expenditure is linked, since each time all printing data have to be newly occupied with the color profile and created in a separation file. This time expenditure can be saved by the method according to the invention. The cost-effectiveness of a printing process is significantly increased in this way.

Furthermore, the invention comprises a device, in particular a printing system, which is configured to carry out the method according to the invention for adapting the printer parameters of a digital printer, wherein the device comprises
   at least one hyperspectral planar measuring device;
   at least one computing unit;
   at least one first digital printer for printing a tone value target;
   optionally a second digital printer for printing a tone value target; and
   optionally at least one means for further processing of a decoration printed on a carrier material.

In one embodiment, the device comprises a hyperspectral planar measuring device. Suitable devices have already been described. In a further embodiment, the device optionally comprises at least one means for further processing of the decoration printed on a carrier material. Such a means for further processing is preferably selected from the group comprising a device for impregnation, a device for compressing the printed carrier material with further layers, such as an impregnation layer, and a device for profiling the printed carrier material.

In one particularly preferred embodiment, the means for compression is a short cycle press (SC press). In a further preferred embodiment, the means for profiling is also a short cycle press. The short cycle press, using which the compression is carried out, is particularly preferably also used for the profiling. The further processing during the impregnation, compression, and profiling was already described in more detail. In one embodiment, the device comprises multiple means for further processing of a decoration printed on a carrier material. This can be a combination of the abovementioned means for further processing of a decoration printed on a carrier material.

The computing unit is, for example, a suitable PC or process computer which is preferably integrated in the device. The computing unit can also not be integrated in the device, however, and therefore can be externally arranged. In this case, the device includes an interface for the computing unit.

Digital printers are known to a person skilled in the art. Digital printers for decorative printing in the industrial area are particularly suitable.

In a further embodiment of the device according to the invention, it furthermore comprises an optical camera system, comprising at least one camera. In one embodiment of the present invention, the optical camera system comprises multiple individual cameras, preferably 2 to 6 individual cameras, particularly preferably 2 to 4 individual cameras. In a further embodiment of the present invention, the optical camera system comprises precisely one camera. In addition to the hyperspectral planar measurement, images of the printed tone value steps can be acquired by the optical camera system. Colorimetric data for the L* value can be ascertained from the images of the camera system.

The features and advantages of the method also apply to the device according to the invention and vice versa.

BRIEF DESCRIPTION OF THE INVENTION

The terms The terms Fig., Figs., Figure, and Figures are used interchangeably in the specification to refer to the corresponding figures in the drawings.

The present invention is explained in more detail hereinafter on the basis of 2 figures and 8 exemplary embodiments.

DESCRIPTION OF THE INVENTION

Figure 1:
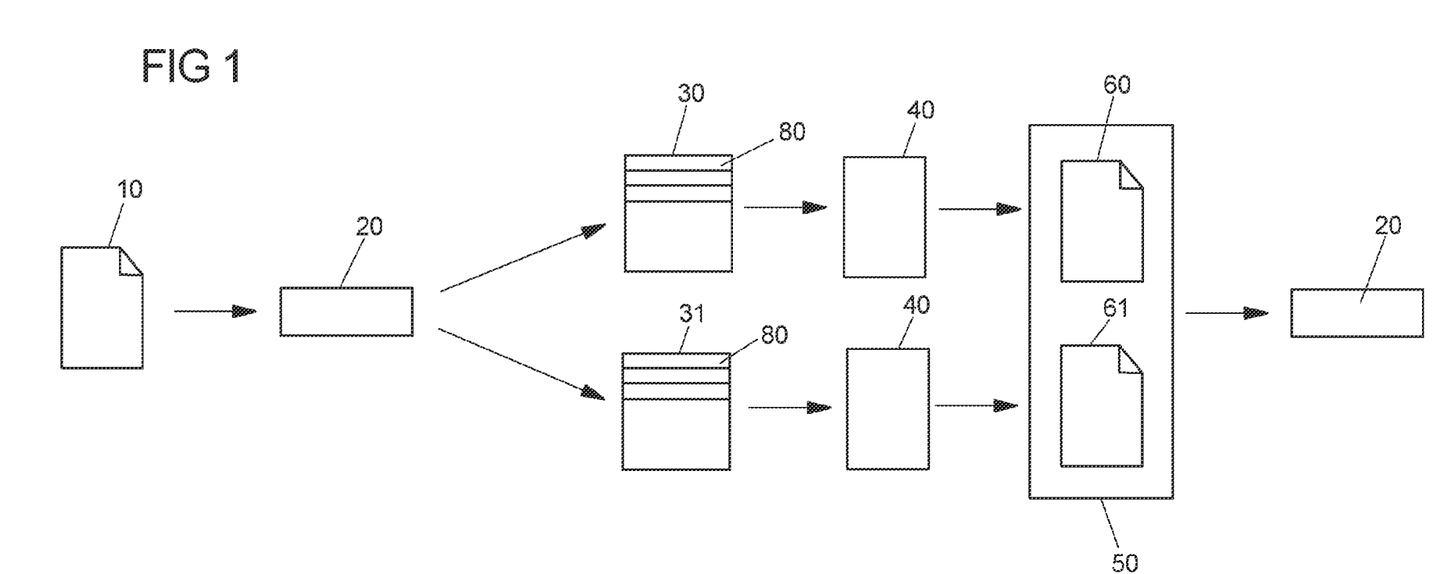
FIG. 1 schematically shows an embodiment of the method according to the invention.

FIG. 1 schematically shows an embodiment of the method according to the invention. A tone value target 10 is created, which is printed by the digital printer 20 on a first carrier material 30. The tone value fields 80 are at least partially measured by a hyperspectral planar measuring device 40 and the data are processed in a computing unit 50. A digital reference pattern 60 is created by the computing unit 50. The tone value target 10 is output on a second carrier material 31 and at least a part of the tone value fields 80 are again measured in a hyperspectral manner by a hyperspectral planar measuring device 40. The data are evaluated in the computing unit 50 and a digital pattern 61 is created. The digital reference pattern 60 and the digital pattern 61 are compared to one another by the computing unit 50 and at least one similarity value is ascertained. If the at least one similarity value is outside a specified tolerance range, an adaptation of at least one printer parameter or a combination of multiple printer parameters of the digital printer 20 takes place.

Figure 2:
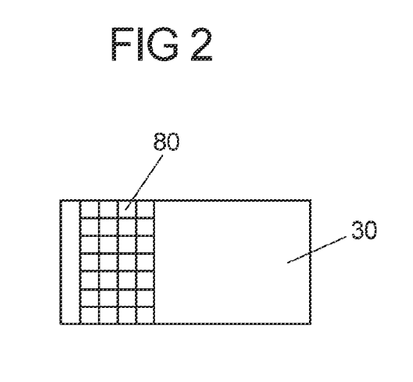
FIG. 2 shows an embodiment of a printed tone value target.

FIG. 2 shows an embodiment of a printed tone value target in which the tone value fields 80 of the tone value target are only applied in the edge region of the carrier material 30.

Exemplary Embodiment 1—Off-Line—Manual Hyperspectral Planar Measurement and Adaptation of the Separation Data by Means of Software A tone value target was created for a CRYK color system. The tone value target comprised 40 tone value fields having graduated tone values per color component. The tone values of successive tone value fields of a color component each differ by 2.5% in the tone value. Subsequently, on a 4-color CRYK paper digital printing system having a printing width of 210 cm, the 40 tone value fields having graduated tone values were printed one behind another in the direction of the printing length between a width of 50 cm and a width of 54 cm of the carrier material for each color component of the color system CRYK. The individual tone value fields were each 10×10 mm in size and the tone value fields of the individual color components were arranged adjacent to one another in the printing width. The arrangement of the tone value fields corresponds to the arrangement shown in FIG. 2. These were measured off-line using a hyperspectral planar measuring device and an L*, an a*, and a b* value were computed and stored for each of the 160 tone value fields. A paper was used as the carrier material.

A digital reference pattern was created from the averaged reference values of the 160 tone value fields, which comprised, inter alia, L*a*b* values for each tone value field.

The tone value target was again output daily on the 4-color CRYK paper digital printing system having a printing width of 210 cm between a width of 50 cm and a width of 54 cm of the carrier material. The type of the carrier material was the same in each case and the printing conditions were also unchanged. The output tone value targets were each measured in a hyperspectral manner and images were recorded over the entire printing width of all tone value fields using the optical camera system. A digital pattern, which was compared to the digital reference pattern, was created from the measurement data on each day. A tolerance range of ±2% was specified.

On the sixth day, the measurement showed a deviation in the digital pattern in comparison to the digital reference pattern. The comparison showed a b* value increased by 1.4 for all tone value steps from the 60% tone value step. This resulted in a similarity value of 4% for the corresponding b* values. These similarity values were therefore outside the tolerance range of ±2%. This was expressed in the printed image by a yellow tinge.

The tone value gradations had accordingly shifted and were no longer provided distributed uniformly in 2.5% steps. Since the similarity value was thus outside the tolerance range of ±2%, the separation data were influenced by means of a software filter such that the deviation was compensated for. The adaptation could be assumed for all printhead regions.

The tone value target was then output a further time on the 4-color CRYK paper digital printing system having a printing width of 210 cm between a width of 50 cm and a width of 54 cm of the carrier material. The software filter was used here for the separation data. The type of the carrier material was unchanged, as were the printing conditions. The output tone value target was again measured in a hyperspectral manner. A digital pattern was again created from the measurement data which was compared to the digital reference pattern. It was not possible to establish deviations between the digital pattern and the digital reference pattern. The similarity value was 0% for all tone value fields and was thus within the tolerance range.

In a next step, a further tone value target was created which included the same tone values as the first tone value target. The tone value fields of the further tone value target had a width which corresponded to the width of the carrier material. All 40 tone value fields of each color component were output one behind another in the printing length on the carrier material. The printing system had an optical camera system using which images were recorded over the entire printing width of all tone value fields. The camera system comprised 4 individual cameras, using each of which an image was recorded. A combined image was then created from the 4 individual images per line, which depicted the entire width of the carrier material. That is to say, 160 lines (wherein each line included one gradation of the tone values of each color component of the CRYK color system) were printed in the direction of the printing length and acquired. On the basis of the image, it was possible to assign the printed tone value fields to all printheads or the individual sections thereof in 10 pixel units. For each region of a tone value field which was printed by a printhead, an L* value was computed from the optical image. The ratio of each L* value to the L* value for this tone value step from the digital reference pattern was calculated and a calibration factor was formed. The calibration factors of a tone value step were compared to a reference value and a similarity value was determined in each case. The calibration factor was used as the reference value here which was computed for the L* values of the printheads already adapted in preceding method steps a) to m). All further calibration factors within a tone value field were each compared to this calibration factor and a similarity value was ascertained in each case. A tolerance range of ±0.5% was specified for the similarity value. None of the similarity values were outside this tolerance range. Therefore, no further adaptations had to be performed on the printheads. All printheads could thus be adapted although the entire tone value target was not measured in a hyperspectral manner.

Exemplary Embodiment 2—In-Line Hyperspectral Planar Measurement and Adaptation of the Separation Data by Means of Software A tone value target was created for a CRYK color system. The tone value target comprised 40 tone value fields having graduated tone values for each color component. The tone values of successive tone value fields of a color component each differed by 2.5% in the tone value. On a 4-color CRYK paper digital printing system having a printing width of 210 cm, in each case a tone value field was printed over the entire width of the carrier material. Each tone value field had a length of 15 mm in the direction of the printing length and the individual tone value fields were printed arranged one behind another in the direction of the printing length. All tone value fields of the tone value target were output. A paper was used as the carrier material.

The tone value fields were measured in line using a traversing hyperspectral planar measuring device. A region having a printing width of 0.3 mm was assigned here to a printhead or separation data region. The entire width of a tone value field was thus divided into multiple individual regions. In the evaluation, hyperspectral mean values were acquired from the individual regions in the format 0.3×15 mm. L*a*b* values were computed from the measurement data and a digital reference pattern was created. A tolerance range of ±2% was specified.

The tone value target was again printed on the next day on the 4-color CRYK paper digital printing system, wherein the same type of carrier material, the same printing conditions, and the same printer parameters were used. The tone value fields were again measured in line using the traversing hyperspectral planar measuring device. The same division of the tone value fields into individual regions was performed for the evaluation as already in the creation of the digital reference pattern. L*a*b* values were computed from the measured values and a digital pattern was created which was compared to the digital reference pattern.

It was shown here that a deviation by more than 2.5% had taken place in a total of 23 tone value fields at 38 printheads. The similarity value of these tone value fields at the printing positions of the 38 printheads was thus at 2.5% and therefore outside the tolerance range. The separation data were thereupon adapted in an automated manner using a software filter. Some printing templates could no longer have been printed with color consistency using the old separation data without software filter, it was possible to avoid this problem, by which it was possible to increase the printing quality.

Exemplary Embodiment 3—Hyperspectral Planar Measurement In-Line and Combination of Adaptation of the Separation Data by Means of Software and Control of the Electrical Voltage of the Printheads A wood decoration was printed on a 4-color CRYK paper digital printing system having a printing width of 210 cm. A daily printing quality check was carried out in order to check, for example, printheads with respect to their intensity/density, since they tend to lose color intensity/density or become weaker with time.

For the check, a tone value target was created using the CRYK color system. The tone value target comprised a tone value field which had a tone value of 100% for each color component. The tone value fields of the 4 color components of the CRYK color system were each output over the entire width on the carrier material and measured using a traversing hyperspectral color measuring device. The measurement region was 15 mm in printing length and 1 mm in printing width, wherein the acquired data were averaged.

In this case, the traverse was subdivided into 4 regions at which the hyperspectral planar measuring device acquired the measurement data. L*a*b* values were computed from the measurement data and a digital reference pattern was created. The carrier material corresponded to the carrier material which was used in the decorative print.

On the next day, the tone value target was again output by the 4-color CRYK paper digital printing system on a carrier material. The same type of carrier material was used and the printing conditions and printer parameters were also unchanged. The tone value fields of the 4 color components of the CRYK color system were measured using the traversing hyperspectral color measuring device. The measurement region was 15 mm in printing length and 1 mm in printing width, wherein the acquired data were averaged. L*a*b* values were computed and a digital pattern was created which was compared to the digital reference pattern, wherein multiple similarity values were ascertained for each tone value field, which were assigned to the individual printheads. A tolerance range of ±2% was specified.

The comparison of the digital pattern to the digital reference pattern showed that the similarity value of 5 printheads was 7% and was thus outside the tolerance range. This was no longer physically correctable solely by color management or software control of the separation data. On the basis of the tone values measured in a planar and hyperspectral manner, on which the digital reference pattern was based, and the ascertained deviation therefrom in the digital pattern, it was possible to raise the electrical voltage by means of software automatically at the 4 deviating printheads and thus correct it. The printheads were now all set so that each printhead could achieve the 100% tone value in all regions.

Exemplary Embodiment 4

Firstly the method described in exemplary embodiment 3 was carried out. However, since only larger regions or entire printheads may be adjusted uniformly via the electrical voltage, in a second step the method described in exemplary embodiment 2 was carried out.

The result was an output homogeneous in the printing width of all tone value steps in the print. This method can be carried out regularly in a manual or fully automated manner in order to ensure a quality check in printing processes.

Exemplary Embodiment 5

Solely as a check during production, various tone value steps were repeatedly also printed continuously in one or both edge regions of a decorative printing order and measured in a planar and hyperspectral manner. In a first method sequence, a digital reference pattern was created for this purpose, which was used in the further method steps for comparison. In this way, it was possible to detect changes of the tone values of the printheads which occurred with time in the edge region. Warning messages were output in the event of deviations and an automatic adaptation of a printer parameter or a combination of printer parameters was performed. The adaptation was performed here for all printheads over the entire printing width of the printer. A correction could therefore be performed without printing data having to be regenerated or a time-consuming color management process running.

Exemplary Embodiment 6—Ink Batch Deviation

The ink batch for the color component cyan was replaced in a printing process. However, the new batch is lighter in the tone value than the old one. When the method was carried out as described in exemplary embodiments 1 to 4, this was reflected in a deviation of the tone value between the digital reference pattern and the digital pattern, since the digital reference pattern was created on the basis of the print of a tone value target using the old ink batch and the digital pattern was created on the basis of the print of a tone value target using the new ink batch. The detected difference was corrected by an adaptation of at least one printer parameter or combination of printer parameters. Deviations in the tone value which are caused by a new ink batch could thus be compensated for.

Exemplary Embodiment 7—Paper Batch Deviation

A new paper batch was used in a printing process. This was somewhat lighter than the one previously used, with an L* value of approximately L*=1.10. The method was carried out similarly to the method described in exemplary embodiment 6, wherein the digital reference pattern was created on the basis of the print of a tone value target on the old paper batch and the digital pattern was created on the basis of the print of a tone value target on the new paper batch. Due to the detected deviation, the electrical voltage of all printhead regions was raised, by which it was possible to correct the lack of intensity in the tone values and decorations could be printed with color consistency in a subsequent printing process.

Exemplary Embodiment 8—Calibration of Two Digital Printers

A tone value target was created for a CRYK color system. The tone value target comprised 40 tone value fields having graduated tone values for each color component. The tone values of successive tone value fields of a color component each differed by 2.5% in the tone value. On a first 4-color CRYK paper digital printing system having a printing width of 210 cm, in each case a tone value field was printed over the entire width of the carrier material until the entire tone value target was output. Each tone value field had a length of 15 mm in the direction of the printing length and the individual tone value fields were printed arranged one behind another in the direction of the printing length. A paper was used as the carrier material.

The tone value fields were measured in line using a traversing hyperspectral planar measuring device. A region having a printing width of 0.3 mm was assigned here to a printhead or separation data region. The entire width of a tone value field was thus divided into multiple individual regions. In the evaluation, hyperspectral mean values are acquired from the individual regions in the format 0.3×15 mm. L*a*b* values were computed from the measurement data and a digital reference pattern was created. A tolerance range of ±2% was specified.

The tone value target was subsequently printed on a second 4-color CRYK paper digital printing system, wherein the same type of carrier material was used. The tone value fields were again measured in line using the traversing hyperspectral planar measuring device. The same division of the tone value fields into individual regions was performed for the evaluation as already in the creation of the digital reference pattern. L*a*b* values were computed from the measurement data and a digital pattern was created, which was compared to the digital reference pattern. A similarity value was computed for each region of a tone value field which was used for the mean value formation.

Some of the similarity values were outside the tolerance range and an adaptation of the separation data and a control of the electrical voltage of the printheads of the second 4-color CRYK paper digital printing system was performed. In this way, it was possible to calibrate the second 4-color CRYK paper digital printing system to the first 4-color CRYK paper digital printing system.

LIST OF REFERENCE NUMERALS

10 tone value target
20 digital printer
30, 31 carrier material
40 hyperspectral planar measuring device
50 computing unit
60 digital reference pattern
61 digital pattern
80 tone value field

The invention claimed is:

1. A method for adapting the printer parameters and/or the separation data of a digital printer, including the following steps
   a) creating and storing a digital tone value target having 1 to n tone value fields, wherein n∈N;
   b) outputting the tone value target on a first carrier material under first printing conditions using first printer parameters by way of a first digital printer;
   c) measuring at least a part of the tone value target output in step b) in a hyperspectral and planar manner, wherein at least the area of the tone value target is measured in a hyperspectral manner, which is covered by a printhead in the print and wherein data are recorded during the hyperspectral planar measurement, the wavelength ranges of which adjoin one another;
   d) forming at least one mean value of the hyperspectral data assigned to a region of a tone value field of a tone value target, which is covered by a printhead in the print;
   e) calculating colorimetric data and/or color density values from the at least one mean value of the hyperspectral data;
   f) creating a digital reference pattern, including at least the colorimetric data and/or the color density values assigned to the region of the tone value field which was used for the formation of the at least one mean value of the hyperspectral data;
   g) outputting the digital tone value target on a second carrier material under second printing conditions using second printer parameters by way of the first digital printer or a second digital printer;
   h) measuring at least a part of the tone value target output in step g) in a hyperspectral and planar manner, wherein at least the area of the tone value target is measured in a hyperspectral manner, which is covered by a printhead in the print and wherein data are recorded during the hyperspectral planar measurement, the wavelength ranges of which adjoin one another;

i) forming at least one mean value of the hyperspectral data assigned to a region of a tone value field of a tone value target which is covered by a printhead in the print;

j) calculating colorimetric data and/or color density values from the at least one mean value of the hyperspectral data;

k) creating a digital pattern, including at least the colorimetric data and/or the color density values assigned to the region of the tone value field which was used for the formation of the at least one mean value of the hyperspectral data;

l) Comparing the digital reference pattern to the digital pattern and ascertaining at least one similarity value; and m) adapting at least one printer parameter and/or the separation data or a combination of multiple printer parameters or a combination of multiple printer parameters and the separation data of the first or second digital printer if the at least one similarity value is outside at least one specified tolerance range, wherein the printer parameters are selected from the group including electrical voltage in the printhead, software control of the printer, and temperature.

2. The method as claimed in claim 1, wherein the first printing conditions and the second printing conditions, and also the first and the second carrier material, are identical.

3. The method as claimed in claim 1, wherein
in method steps d) and i), mean values of the hyperspectral data are formed assigned to various regions of tone value fields of a tone value target, wherein the various regions of the tone value fields of a tone value target are each covered by a printhead in the print;
in method steps e) and j), colorimetric data and/or color density values are calculated from each mean value of the hyperspectral data;
in method step f), a digital reference pattern is created, which includes the colorimetric data and/or the color density values assigned to the regions of the tone value fields which were used for the formation of the mean values of the hyperspectral data; and
in method step k), a digital pattern is created, which includes the colorimetric data and/or the color density values assigned to the regions of the tone value fields which were used for the formation of the mean values of the hyperspectral data.

4. The method as claimed in claim 1, wherein the comparison of the digital reference pattern to the digital pattern in method step l) takes place in a manual or automated manner.

5. The method as claimed in claim 1, wherein at least one similarity value is provided as a deviation between colorimetric data, in particular L*a*b* values and/or as deviations between color density values and/or as a color distance ΔE and/or as a similarity index.

6. The method as claimed in claim 1, wherein the adaptation of the at least one printer parameter or a combination of multiple printer parameters of the first or second digital printer takes place automatically or manually.

7. The method as claimed in claim 1, wherein method steps g) to m) are run through until the similarity value is within the at least one specified tolerance range.

8. The method as claimed in claim 1, wherein method steps g) to m) are repeated after a specified time.

9. The method as claimed in claim 1, wherein the carrier material is selected from the group including paper, glass, metal, films, wooden material panels, in particular MDF or HDF panels, WPC panels, veneers, lacquer layers, plastic panels, and inorganic carrier panels.

10. The method as claimed in claim 1, wherein a decoration is printed on the second carrier material adjacent to the tone value target, and wherein the decoration is printed on the second carrier material using the same digital printer as the tone value target.

11. The method as claimed in claim 1, wherein furthermore after the adaptation of at least one printer parameter or a combination of multiple printer parameters, a decoration is printed on the second carrier material, and wherein the decoration is printed on the second carrier material using the same digital printer as the tone value target.

12. The method as claimed in claim 1, wherein the method is integrated in-line in a printing process or is carried out off-line.

13. The method as claimed in claim 1, wherein the method furthermore comprises the following steps
n) optionally creating and outputting a further tone value target on a carrier material using a first or second digital printer, wherein each tone value field of the tone value target is output over the entire width of the carrier material;
o) Recording at least one image of the tone value target output in method step g) or in method step n) using an optical camera system;
p) computing the L* values for each region of a tone value field from the at least one image which can be assigned to a printhead;
q) computing calibration factors using the L* values from the at least one image and the L* values of the digital reference pattern;
r) comparing the calibration factors and computing at least one similarity value; and
s) adapting at least one printer parameter or a combination of multiple printer parameters of the first or second digital printer if the at least one similarity value is outside at least one specified tolerance range.

14. A device, in particular a printing system, configured to carry out a method for adapting the printer parameters and/or the separation data of a digital printer as claimed in claim 1, wherein the device comprises
at least one hyperspectral planar measuring device;
at least one computing unit;
at least one first digital printer for printing a tone value target;
optionally a second digital printer for printing a tone value target; and
optionally at least one means for further processing of a decoration printed on a carrier material.

15. The device as claimed in claim 14, furthermore including an optical camera system.

* * * * *